United States Patent
Deloatch et al.

(10) Patent No.: US 12,363,153 B1
(45) Date of Patent: Jul. 15, 2025

(54) SECURITY SYSTEM FOR HARDENING A DIGITAL SYSTEM AGAINST MALWARE AND METHOD OF OPERATION

(71) Applicant: The Government of the United States as represented by the Director, National Security Agency, Ft. George G. Meade, MD (US)

(72) Inventors: Daryle D. Deloatch, Severn, MD (US); Mark J. Haney, Cooksville, MD (US)

(73) Assignee: The Government of the United States as represented by the Director, National Security Agency, Ft. George G. Meade, MD (US)

( * ) Notice: Subject to any disclaimer, the term of this patent is extended or adjusted under 35 U.S.C. 154(b) by 285 days.

(21) Appl. No.: 17/937,216

(22) Filed: Sep. 30, 2022

Related U.S. Application Data

(60) Provisional application No. 63/250,409, filed on Sep. 30, 2021.

(51) Int. Cl.
*H04L 9/40* (2022.01)
(52) U.S. Cl.
CPC ...... *H04L 63/1433* (2013.01); *H04L 63/1416* (2013.01)

(58) Field of Classification Search
None
See application file for complete search history.

(56) References Cited

U.S. PATENT DOCUMENTS

| | | | |
|---|---|---|---|
| 2014/0123280 A1* | 5/2014 | Kedma | G06F 11/3003 726/23 |
| 2015/0207785 A1* | 7/2015 | Sathaye | H04L 9/0894 713/168 |
| 2017/0094024 A1* | 3/2017 | Braudes | G06F 8/61 |
| 2022/0006726 A1* | 1/2022 | Michael | H04L 45/745 |
| 2022/0318204 A1* | 10/2022 | Sinha | G06F 16/1734 |
| 2022/0368726 A1* | 11/2022 | Balasubramaniam | H04L 63/1441 |
| 2023/0308458 A1* | 9/2023 | Varsanyi | H04L 63/166 |

* cited by examiner

*Primary Examiner* — Trang T Doan

(57) ABSTRACT

The present invention is a security system and method for hardening a digital system. The security system includes a plurality of scanners loaded in various hosts provided by digital devices of the digital system. Each scanner is configured to perform scanner operations and use communication paths to communicate with other scanners in the security system. The decentralized nature of the scanners and the ability to communicate amongst the various scanners provides the ability to quickly assess and monitor the entire digital system thereby providing the ability to quickly prevent, detect and respond to malicious attacks.

28 Claims, 10 Drawing Sheets

| | A | B | C | D | E | F | G | H | I | J | K | L | M | N |
|---|---|---|---|---|---|---|---|---|---|---|---|---|---|---|
| | Time Period | File Ext. Change Rate | File Ext. CW | File Ext. ToOW | OW1 | File Size Change Rate | File size CW | File Size ToOW | OW2 | File Char. Change Rate | File Char. CW | File Char. ToOW | OW3 | TH |
| 1 | 0000-0159 | 0 | 65 | 100 | 165 | 0 | 40 | 100 | 140 | 0 | 15 | 100 | 115 | 0.0000 |
| 2 | 0200-0359 | 0 | 65 | 100 | 165 | 0 | 40 | 100 | 140 | 0 | 15 | 100 | 115 | 0.0000 |
| 3 | 0400-0559 | 0 | 65 | 100 | 165 | 0 | 40 | 100 | 140 | 0 | 15 | 100 | 115 | 0.0000 |
| 4 | 0600-0759 | 5 | 65 | 80 | 145 | 10 | 40 | 80 | 120 | 2 | 15 | 80 | 95 | 5.8750 |
| 5 | 0800-0959 | 15 | 65 | 70 | 135 | 20 | 40 | 70 | 110 | 5 | 15 | 70 | 85 | 14.0909 |
| 6 | 1000-1159 | 15 | 65 | 60 | 125 | 40 | 40 | 60 | 100 | 8 | 15 | 60 | 75 | 21.5833 |
| 7 | 1200-1359 | 35 | 65 | 60 | 125 | 30 | 40 | 60 | 100 | 20 | 15 | 60 | 75 | 29.5833 |
| 8 | 1400-1559 | 25 | 65 | 70 | 135 | 60 | 40 | 70 | 110 | 20 | 15 | 70 | 85 | 35.3788 |
| 9 | 1600-1759 | 15 | 65 | 70 | 135 | 20 | 40 | 70 | 110 | 5 | 15 | 70 | 85 | 14.0909 |
| 10 | 1800-1959 | 0 | 65 | 90 | 155 | 10 | 40 | 90 | 130 | 2 | 15 | 90 | 105 | 3.8718 |
| 11 | 2000-2199 | 0 | 65 | 100 | 165 | 0 | 40 | 15 | 55 | 0 | 15 | 10 | 25 | 0.0000 |
| 12 | 2200-2399 | 0 | 65 | 100 | 165 | 0 | 40 | 15 | 55 | 0 | 15 | 10 | 25 | 0.0000 |

FIG. 3

SECURITY SYSTEM FOR HARDENING A DIGITAL SYSTEM AGAINST MALWARE AND METHOD OF OPERATION

This application claims priority to provisional patent application 63/250,409 filed Sep. 30, 2021 the contents of which are incorporated herein by reference.

FIELD OF THE INVENTION

The present invention relates, in general, to information security and in particular, to intrusion prevention, intrusion detection, and recovery of systems after intrusion.

BACKGROUND OF THE INVENTION

Ransomware is a type of malware used to deny an authorized digital system user access to content on that user's computer system. For example, ransomware has been used to deny users of hospital computer systems to patient records or the hospital computer system itself. Various methods are employed by these ransomware attacks to deny access to these records including encryption, deletion, or exfiltration of data/records, or modification, removal or deletion of permissions, etc. Application of the ransomware essentially locks the user out of the software or device on which the ransomware has been applied. As a result, the user is unable to perform their authorized functions.

Commercial anti-malware solutions for such attacks include, for example, anti-ransomware or anti-virus solutions. These solutions typically serially scan the device's software (e.g., files, folders, configurations, logs, drivers, services, policies, settings, records, history, version) from a single centralized point in a sequential order, i.e., one scan of files in one folder needs to be completed before the scan of the files in the next folder begins. As a result, a complete scan of all files of the device using a centralized scanner can take a significant amount of time. This weakness is exploited by ransomware attackers who aim to inflict their attack before the victim's security solution detects the attack. In addition to the amount of time needed to scan the files, a centralized scanner provides a single point of failure and is therefore prone to tamper. There is a need therefore for an anti-malware solution which detects the intrusion as early as possible and which decreases the amount of time required to scan the files of the device.

A digital system employing a prior art anti-malware solution 10 is illustrated in FIG. 1. The digital system 10 employing the anti-malware solution includes a plurality of digital devices 12-22 connected via wired or wireless connections. The digital devices provided by the digital system 10 illustrated in FIG. 1 include a hard drive 12, a memory 14, removable media 16, external storage 18, a virtual device 20, and cloud-based storage 22. The hard drive 12, memory 14 and removable media 16 may be provided by an integrated system 24, for example a computer or a laptop connected via internal connections. As illustrated in FIG. 1, the integrated system 24 includes a network interface 26 for connecting external digital devices to the digital devices 12-16 of the integrated system 24. Digital devices connected via the network interface 26 illustrated in FIG. 1 include the external storage 18 (e.g., a hardware peripheral housing an operating system or applications), the virtual device 20 (i.e., a software emulation of device), and the cloud-based storage 22. Each digital device 12-22 includes at least one root directory and at least one top-level folder within the root directory. A device 12-22 may have multiple root directories. For example, a device with more than one drive has multiple root directories. A drive is a location (e.g., medium) that is capable of storing and reading information that is not easily removed like portable removable media. A drive is a component of a device and each drive has a root directory. Drives contained within a device 12-22 can each include partitions. A partition is the allocation of storage space within the drive 12-22 into smaller separate software/data areas. A root can be present on each of these partitions.

As illustrated in FIG. 1, a centralized scanner 30 is provided within a top-level folder of the hard drive 12. The centralized scanner 30 is provided by anti-malware software (e.g., anti-virus software, malware detection software and/or ransomware detection software). The centralized scanner 30 runs as an application stored at a single location in the top-level folder of the digital device 12. For example in devices running Windows, UNIX, or MAC OS, the centralized scanner application is first installed in a program folder (i.e., "a top-level folder designed to host applications and associated supporting files/folders that enable initialization, execution, operation and maintenance of the application) and then run as an application from a temporary memory (e.g., RAM). Before running the centralized scanner 30, the scanner is configured.

Configuration of the centralized scanner 30 involves identifying the operations to be monitored by the scanner. For example, because changes of file extensions from .txt to .zip often provide an indication that the files are being encrypted, a scanner may be configured to observe these file extension alterations in an effort to detect a ransomware act. Other types of ransomware attacks change a portion of the content of a file by replacing characters within the file. Instead of attempting to detect a subtle swap of characters specifically, current commercial solutions try to detect the character replacement using hashing techniques. Unfortunately, these hashing techniques are not fool proof and certain character replacement techniques can side step these hashing techniques.

With respect to each of the operations used to detect malware, time is a significant factor. Configuration of the scanner 30 incudes designating an initial file on which scanning will begin and designating a scan sequence. For example, once the centralized scanning operation is initiated, scanning proceeds through the designated scan sequence until all designated files have been scanned by the centralized scanner 30. The centralized scanner 30 performs operations in order to detect the presence of malware (e.g., the centralized scanner 30 may be configured to identify the encryption of files by observing alteration of the file extensions associated with the scanned files). The time elapsed prior to the scanning operation reaching a particular designated file depends upon the number of files to be scanned and the designated scan sequence, i.e., if the particular designated file is late in the designated sequence, it will take a long time for the centralized scanner to scan that particular designated file. Most attempts to scan large hard drives or folders containing large numbers of designated files (e.g., top-level folders) take a long time since each designated file of the digital device is scanned in a consecutive manner, i.e., the scan of all files in one folder is completed before the scan of the files in the next folder begins.

Malware attackers take advantage of this slow-paced scanning provided by a centralized scanner. If the malware can complete its operation faster than the anti-malware can complete its scan of the effected folders, the malware attacker can exploit the digital system. In addition to the slow-paced scanning provided by existing anti-malware scanners, the centralized nature of these existing scanners provides a single point of failure making the centralized scanner vulnerable to tamper.

Most commercial anti-ransomware solutions examine operations within the system's operating space, where applications normally reside (i.e. the file system itself). Because these anti-ransomware solutions do not target memory (a place where temporary information is stored), memory has grown into a stage point for exploitation by ransomware. By executing code directly in memory (versus having a file that contains the ransomware) attackers have found a path to side step security designed to examine operations within the system's hardware and software.

SUMMARY OF THE INVENTION

Briefly, the present invention discloses a security system and method for hardening a digital system. The security system includes a plurality of scanners loaded in various hosts provided by digital devices of the digital system. Each scanner is configured to perform scanner operations and to communicate with other scanners in the security system. The decentralized nature of the scanners and the ability to communicate amongst the various scanners provides the ability to quickly assess and monitor the entire digital system thereby providing the ability to quickly prevent, detect and respond to malicious attacks.

BRIEF DESCRIPTION OF THE DRAWINGS

Various aspects of the present invention, as well as the structural and operational features of certain exemplary embodiments disclosed herein, may be better understood by reference to the following description, taken in connection with the accompanying drawings, wherein like reference numerals identify like elements in which:

FIG. 3 illustrates sample file characteristic change rates and threshold calculations associated with a time-based polyrational analysis:

DETAILED DESCRIPTION OF THE PREFERRED EMBODIMENT

While the invention may be embodied in different forms, there are shown in the accompanying drawings and described in detail herein specific embodiments of the invention which exemplify the principles of the invention for certain illustrative applications. It is to be understood that this collective disclosure is meant to be illustrative and exemplary and is not intended to limit the invention to that as illustrated and described herein.

Figure 1:
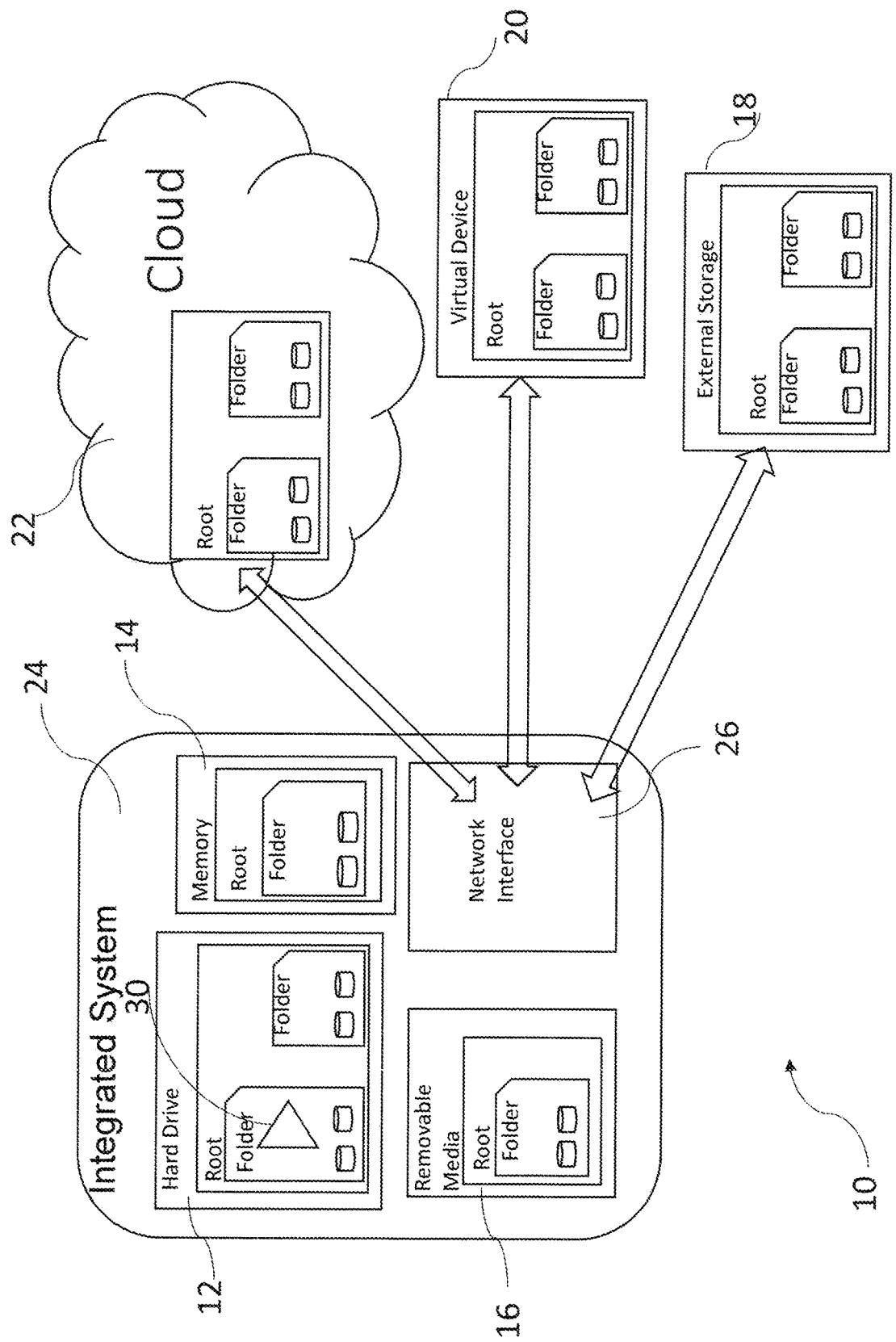
FIG. 1 illustrates a prior art digital system employing a prior art ransomware detection system.
Figure 2:
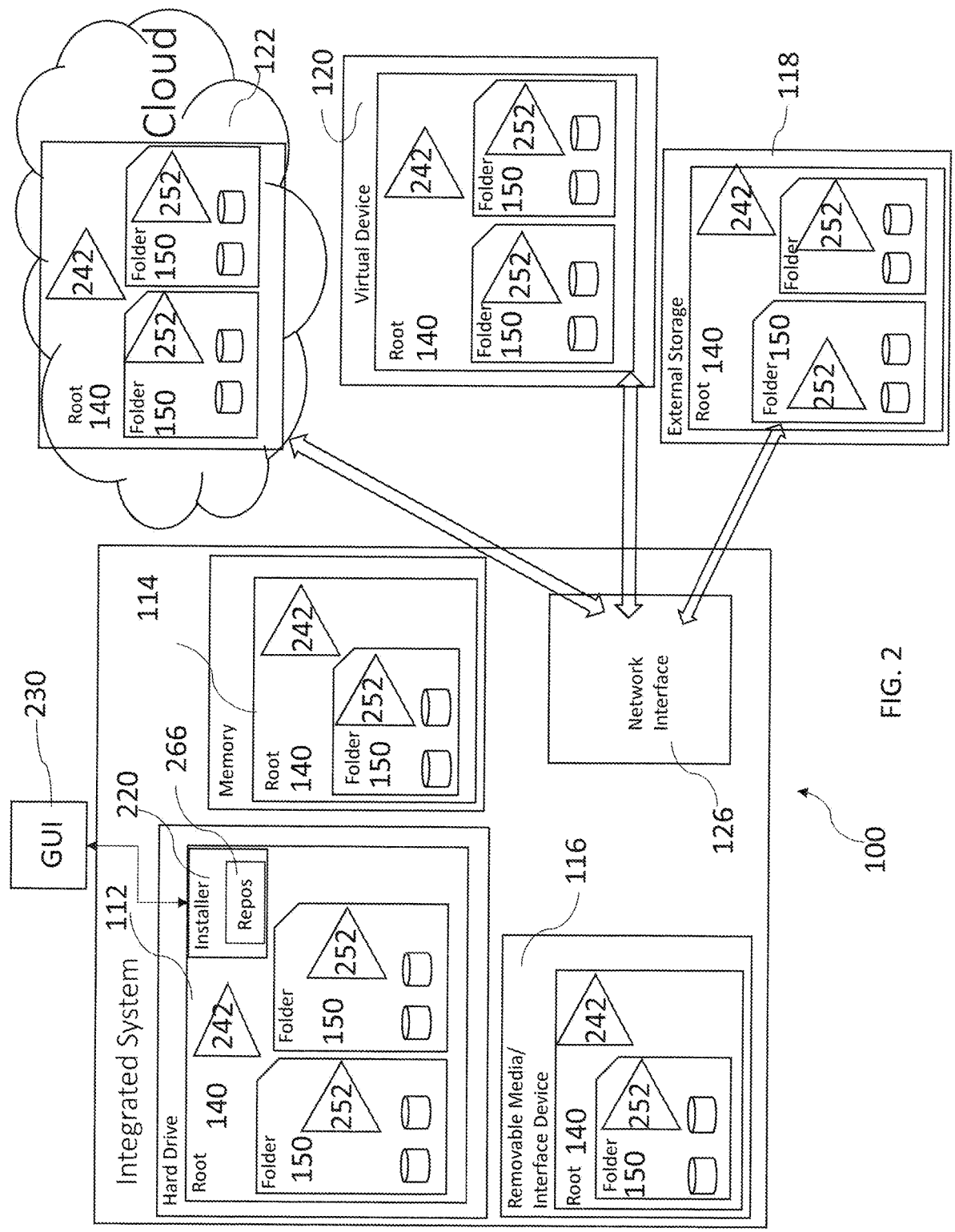
FIG. 2 illustrates a digital system employing the security system of the present invention.

A digital system 100 employing the security system 200 of the present invention is illustrated in FIG. 2. The digital system 100 includes a plurality of digital devices connected via wired or wireless connections. The digital devices provided by the digital system illustrated in FIG. 2 include a hard drive 112, a memory 114, removable media 116, external storage 118, a virtual device 120, and cloud-based storage 122. The hard drive 112, memory 114, and removable media 116 may be provide by an integrated system 124, for example a computer or a laptop connected via internal connections. Examples of other integrated systems could include, for example, a smartphone, a server, an internet of things client, medical equipment, test equipment, a tablet, etc. As illustrated in FIG. 2, the integrated system 124 includes a network interface 126 for connecting external digital devices 118, 120, 122 to the digital devices of the integrated system 124. Digital devices connected via the network interface 126 illustrated in FIG. 2 include the external storage 118 (e.g., a hardware peripheral housing an operating system or applications), the virtual device 120 (i.e., a software emulation of device), and the cloud-based storage 122. The cloud-based storage 122 provides externally hosted storage in the form of software folders. Cloud-based software folders may be hosted on the internet or an intranet (closed network). Cloud-based software folders may provide a hierarchy-based folder structure for hosting an operating system and/or applications.

As further illustrated in FIG. 2, each device 112-122 includes at least one root directory 140 and each root directory 140 may include one or more top-level folders 150 along with additional lower-level folders within the top-level folders 150. A device hierarchy is based on logical, physical, and virtual locations and provides a mechanism for identifying the location of the contents of each device. The device hierarchy represents the relationships amongst all directories and folders of each device 112-122. Each device 112-122 includes at least one root directory 140 at the highest level of the device's hierarchy. In addition, each device 112-122 may include folders within the root directory. Folders provided at the highest hierarchy level within the root directory 140 are identified as top-level folders 150 and are illustrated in FIG. 2. Although not illustrated, any number of folder levels may be provided below these top-level folders 150.

As will be described herein the security system 200 of the present invention generally includes an installer 220, a graphical user interface 230 allowing a user to communicate with the installer 220, a plurality of root scanners 242 and a plurality of folder scanners 252. Each root scanner 242 is hosted by a root directory 140 and each folder scanner 252 is hosted by a top-level folder 150.

Each scanner 242, 252 performs scanner operations designed to detect malware operations. In some instances, scanner operations require communications between scanners loaded within neighboring hosts (i.e., neighboring root directories 140 or folders 150). Neighboring hosts 140, 150 are identified based upon the host's characteristics. Although a variety of methods may be used to identify hosts as neighbors, some example methods for defining neighboring hosts are described herein.

One method for identifying neighboring hosts utilizes particular host attributes or a combination of host attributes (e.g., folder name, folder date, folder size, folder type (ex.

video, picture, documents, downloads, music, etc.)). For example, all hosts containing video type files maybe defined as neighbors. Alternatively, all hosts containing a file of size greater than 5 GB may be defined as neighbors.

In another method, hosts having similar spatial mapping may be identified as neighbors. Access to a host requires reading of a specific part of the hard drive or memory. All hosts which require access to the same part of the hard drive or memory are similarly spatially mapped and may be defined as neighbors.

In still another method, hosts experiencing similar activity/usage (sometimes referred to as having the same "temporal locality") may be identified as neighbors. For example, hosts used in association with a particular software application have the same temporal locality and may therefore be identified as neighbors based upon the same temporal locality. Because some software applications use unique naming conventions, these naming conventions may be used to identify hosts having similar temporal locality.

The installer 220 of the security system 200 is loaded in a root directory 140. Although FIG. 2 illustrates an installer 220 loaded in device 112, it is to be understood that the installer may be loaded in a root directory 140 of any device 112-122 of the digital system 100. Alternatively, multiple installers 220 may be provided with each installer 220 loaded in a root directory 140.

Upon activation, the installer 220 assesses the security state of the digital system 100. The installer 220 uses well-known techniques to poll the hosting digital device 112, the digital system 100 and each remaining digital device 114-122 in communication with the digital system 100 to identify the security settings of the digital system 100 (e.g., policies in place on the digital devices, application permissions, or user privileges). Using native commands, the installer 220 polls the system to check for outdated OS, outdated applications, missing security components (e.g., firewalls, antivirus software), etc. After polling the installer compares the security state of the digital system 100 with recommended security guidelines and reports any vulnerabilities. The installer 220 further uses well-known techniques to poll the hosting digital device 112, the digital system 100 and each remaining digital device 114-122 in communication with the digital system 100 to identify the hierarchy of the digital device 112, the digital system 100 and each remaining digital device 114-122. Using native commands, the installer 220 polls the OS by querying the application or OS users, system logs, system updates, and ARP tables in an effort to gain rudimentary information about the OS and its hosted content (e.g., applications, drivers, policies, interfaces, configurations). Upon completion of the polling by the installer 220, digital system information acquired includes, for example, the presence of all digital devices of the digital systems; the type of devices 112-122 provided by the digital system; the hierarchy of each device 112-122 (e.g., the location of each root directory 140 and any top-level folders 150) and the identification of neighboring hosts.

Each scanner 242, 252 is associated with a repository 266 used to store data collected by the scanner 242, 252, results of analysis performed by the scanner 242, 252, etc. as will be described below. A variety of locations are available for the repositories 266. A central repository 266 may be located, for example, within the installer 220 as illustrated in FIG. 2. Alternatively, the repository 266 may be located within the scanner, outside the scanner but within a secure location on the device (e.g., top-level folder, root directory); within the kernel, in the application layer, or held externally in another device (e.g., secure token, storage, etc.).

Prior to placement of the scanners 242, 252 within the hosts 140, 150, the installer 220 configures each scanner 242, 252 to perform scanner operations. The configuration of each scanner 242, 252 may be independently selected and may be based upon a variety of factors, including for example, the type of device on which the scanner will operate, the scanner's host (i.e., a root directory or a top-level folder), whether the neighboring hosts have been identified, the scanner operations desired, etc. The scanner configuration may be selected by default by the installer or may be selected at the direction of a user. A graphical user interface (GUI) 230 is provided in communication with the installer 220 and provides the user the ability to interact with the installer 220 for the purpose of configuring each scanner 242, 252 or tailoring the configuration of each scanner 242, 252 after loading of the scanner in the host 140, 150 as will be described below.

Scanners 242, 252 may be configured to perform a wide variety of scanner operations based upon the overall objectives of the security system 200. A number of scanner operations have been described herein by way of example.

An example of a scanner operation is content scanning. This scanner operation includes observing the contents of host and lower level folders to scope the order and preference of the contents to be scanned.

Another scanner operation is data collection. As will be described below, different scanner analyses require different data. Each scanner 242, 252 may be configured to collect the data required for the analyses to be performed by the scanner 242, 252. The OS has native commands which can be leveraged by the scanner to collect certain data. For example in the Windows OS, file size data may be collected by leveraging the native OS command "dir [name of file].ext". Data collected for file-type analyses may include, for example, file characteristics such as file extensions or file sizes. Data collected for system-type analyses may include data related to the receipt of incoming directives (e.g., directives to set permissions or directives to configure wireless); data related to the receipt of incoming commands (e.g., commands to load applications, commands to initiate processes); data related to the receipt of incoming requests (e.g., encryption requests); data related to outgoing directives (e.g., directives to share files, or directives to delete files); data related to outgoing commands (e.g., commands to activate debug modes which could result in disablement of security); and data related to outgoing requests (e.g., requests for remote shell creation or requests to identify the version of the OS operating on the digital device).

Another scanner operation is sending and/or receiving data (i.e., sharing data) between scanners. For example, the scanners 242, 252 may be configured to share data with neighboring scanners 242, 252.

Another scanner operation is analysis. Analysis operations require configuration of the scanner to collect data and perform analyses based upon the data collected. After loading the scanners 242, 252 in the hosts 140, 150, data is collected regarding the relevant operations of digital system under normal operating conditions to establish baselines related to the normal operating conditions. This process will be referred to as a baselining mode. As operation of the digital system continues, each scanner 242, 252 continues to collect and analyze data. Operation of each scanner 242, 252 while data is collected for the purpose of monitoring the digital system is referred to herein as a monitoring mode. It is to be understood that each scanner or a group of scanners may be in a baselining mode while another scanner or group of scanners may be in a monitoring mode.

The scanners 242, 252 may be configured to perform many types of analysis scanner operation. Some analysis scanner operations may provide analysis related to file/folder attributes and are referred to herein as file-type analysis scanner operations. Examples of file-type analysis scanner operations include file encryption analysis, file deletion analysis, landmine, or polyrational file analysis. Alternatively, analysis scanner operations may provide analysis related to system attributes (e.g., the services, policies, behavioral aspects or status of the digital system 100) and are referred to herein as system-type analysis scanner operations. Examples of system-type analysis scanner operations include process shut-down analysis, system vulnerability analysis and scanner functionality analysis. As noted above, scanner configurations, including analysis operations, may be configured by default by the installer. Alternatively, the user may utilize the GUI to configure the analysis scanner operations. For example, for file-type analysis operations, the user may be presented with the ability to choose which files to include in the file-type analysis. Detailed examples of system-type analysis scanner operations and file-type analysis scanner operations are provided below.

A process shut-down system-type analysis scanner operation is intended to detect the presence of malware based upon the rate at which processes of the digital system 100 are shut-down. A scanner 242, 252 configured to perform a shut-down analysis is configured as described herein. As activity occurs in the digital system 100 during a baselining mode of the scanner, data related to shut-down processes and required for the shut-down analysis is collected by the configured scanner 242, 252. Using the data collected during the baselining mode of the scanner, the configured scanner calculates a baseline shut-down rate and a threshold based on the baseline shut-down rate is set by the configured scanner 242, 252. As activity continues in the digital system 100, the configured scanner 242, 252 continues to collect data related to shut-down processes during a monitoring mode. The data collection occurs as configured by the scanner. For example, the scanner may be configured to collect the data at pre-determined periodic intervals. The configured scanner 242, 252 determines process shut-down rates based on data collected during the monitoring mode and compares the rates to the set threshold. When the process shut-down threshold is exceeded, a pre-determined responsive action is taken by the configured scanner 242, 252.

A vulnerability system-type analysis scanner operation is intended to evaluate indicators of a system's vulnerability to malware. A scanner 242, 252 configured to perform a vulnerability analysis is configured as described herein. As activity occurs in the digital system 100 during a baselining mode of the scanner, data related to vulnerability indicators and required for the vulnerability analysis is collected by the configured scanner 242, 252. Using the data collected during the baselining mode, the configured scanner calculates a baseline vulnerability measurement and a vulnerability threshold is set based upon the calculated baseline. As activity continues in the digital system 100, the configured scanner 242, 252 continues to collect data related to vulnerability indicators during a monitoring mode of the scanner. The data collection occurs as configured by the scanner. The configured scanner 242, 252 determines vulnerability measures based on data collected during the monitoring mode and compares the vulnerability measure to the set threshold. When the vulnerability threshold is exceeded, a pre-determined responsive action is taken by the configured scanner 242, 252.

A scanner health system-type analysis scanner operation is intended to evaluate the health of scanners 242, 252 located throughout the digital system 100. A scanner 242, 252 configured to perform a scanner health analysis is configured as described herein. As activity occurs in the digital system 100 during a baselining mode of the scanner, the configured scanner 242, 252 receives messages from various scanners 242, 252 throughout the digital system 100 and assess whether the sending scanners are operating properly (i.e., whether the scanners are "healthy"). Data related to the health messages is collected by the configured scanner 242, 252. Using the data collected during the baselining mode of the scanner, the configured scanner calculates a baseline health measurement and a scanner health threshold is set based upon the calculated baseline. As activity continues in the digital system 100, the configured scanner 242, 252 continues to collect data related to the health of the sending scanners during a monitoring mode. The data collection occurs as configured by the scanner 242, 252. The configured scanner 242, 252 measure the scanner health based on data collected during the monitoring mode and compares the scanner health to the set health threshold. When the health threshold is exceeded, a pre-determined responsive action is taken by the configured scanner 242, 252.

An encryption file-analysis type scanner operation is intended to detect malware operations which encrypt a files of the digital system, making the files inaccessible to the authorized users. Characteristics observed when a file is encrypted include alteration in the size of the file, alteration of the file's extension, or alteration of characters within the file. Observation of these characteristics therefore can provide an indication that malware operations have occurred in the digital system. A scanner 242, 252 configured to perform an encryption analysis operation is configured as described herein. As activity occurs in the digital system 100 during a baselining mode of the scanner, data to identify the rate at which file size or file extensions are altered and required for the encryption analysis is collected by the configured scanner 242, 252. Using the data collected during the baselining mode, the configured scanner calculates a baseline file size alteration rate or file extension alteration rate and thresholds based on these rates are set by the configured scanner 242, 252. Alternatively, predetermined/default thresholds may be used. As activity continues in the digital system 100 during a monitoring mode of the scanner, the configured scanner 242, 252 determines file size alternation rates or file extension alteration rates at predetermined intervals. The scanner 242, 252 compares these rates determined during the monitoring mode with the threshold rates. When the monitoring mode rate exceeds the threshold rate, a pre-determined responsive action is taken by the configured scanner.

A deletion file-analysis type scanner operation is intended to detect malware operations which result in the unauthorized deletion of files. A decrease in the number of files within a folder may indicate malware operations have occurred in the digital system 100. A scanner 242, 252 configured to perform deletion analysis is configured as described herein. As activity occurs in the digital system 100 during a baselining mode, data related to file deletion and required for the deletion analysis is collected by the configured scanner 242, 252. Using the data collected during the baselining mode, the configured scanner 242, 252 calculates a deletion rate and a threshold based on the deletion rate is set by the configured scanner 242, 252. As activity continues in the digital system 100 during a monitoring mode of the scanner, the configured scanner 242, 252 continues to collect data related to file deletions during the monitoring mode. The configured scanner 242, 252 determines file deletion rates based on the data collected during the monitoring mode and compares the rates to the set threshold. When the deletion rate threshold is exceeded, a pre-determined responsive action is taken by the preconfigured scanner.

A landmine file-analysis type scanner operation is intended to detect the presence of an intruder in the digital system 100. For this operation a file is replicated with minor modifications to create a cloned file which appears to be a legitimate file within the folder, however the cloned file acts as landmine. During the baselining mode of operation of the scanner, the cloned file is evaluated to provide baseline data regarding the landmine (e.g., file type, file size, file location) and a landmine threshold(s) is set based upon the baseline(s). For example, a file size change threshold may be set to zero. As activity continues in the digital system 100 while the scanner is in a monitoring mode, the configured scanner 242, 252 continues to collect landmine related data. The configured scanner 242, 252 evaluates the data collected during the monitoring mode to determine if any thresholds have been exceeded. For example, given that in normal operating conditions the file size of the landmine file should not change, the file size change threshold is set to zero. Therefore, any change to the file size of the landmine results in the threshold being exceeded. Similarly, given that in normal operating conditions the file location of the landmine file should not change, a file location threshold is exceeded if any change has been made to the file location or if the file is deleted. When a landmine threshold is exceeded, a pre-determined responsive action is taken. The responsive action, may be for example, a lock down of the device/system along with sending an alert to the user. An alternative landmine scanner operation utilizes a cloned file which includes an executable file (i.e. a hidden agent), which is activated when the cloned file is moved/deleted. A scanner configured to perform a landmine analysis having using a landmine with a hidden agent performs a responsive action in response to activation of the executable file. The responsive action may be for example, sending an alert to other scanners in the digital system and/or the user. Alternatively, the responsive action may be sending information regarding the cloned file's new location to the user.

A time-based polyrational file-analysis type scanner operation utilizes multiple file characteristics in combination with the time at which an event occurs (i.e., the time-of-occurrence) to provide an indication of malware operations in the digital system 100. Data related to each of the file characteristics may be collected by a plurality of scanners and shared with the scanner performing the polyrational analysis. In some instances, the time-of-occurrence is a significant factor in determining whether the event is judged to be abnormal. This scanner operation requires the scanners 242, 252 to collect data regarding multiple file characteristics (e.g., file extension alteration, tile size) during specified time periods when each scanner is operating in a baselining mode to establish baseline measures for each specified time period. Using the baseline measures, each time period is weighted and a coordinated baseline threshold is established. During a monitoring mode of each scanner, the scanner operation collects data regarding the multiple file characteristics. The time-based weights are applied to the data collected during the monitoring mode to calculate a coordinated monitoring threshold. The coordinated monitoring threshold is compared to the coordinated baseline threshold. If the coordinated baseline threshold is exceeded, a pre-determined responsive action is taken.

To aid in understanding, the time-based polyrational file analysis scanner operation the following more detailed example is provided. For this time-based polyrational file analysis scanner operation it is determined that the data characteristic of file extension alteration, file size alteration and file character alterations will be monitored and the following definitions are provided:

% extension alterations=(# of file extension altered/total # of files in folder)*100.

File extension alteration rate=% extension alterations/time.

% size alterations=(# of file sizes altered/total # of files in folder)*100.

File size alteration rate=% size alterations/time.

% character alterations=(# file characters altered/total # file characters in folder)*100.

File character alteration rate=% character alterations/time.

When scanner operations are initiated, the appropriate data is collected from three scanners positioned in different hosts throughout the digital system 100 and the above-identified alteration rates are calculated for various periods of time. The table provided in FIG. 3 illustrates file characteristics alteration rates at 2-hour time intervals to cover the 24 hours in a day. Specifically, column B provides files extension alteration rates, column F provides file size alteration rates, and column J provides file character alteration rates. Each calculated rate is based upon data collected during a baselining mode of each scanner using the above calculations.

As further illustrated in FIG. 3, for each file characteristic a criticality weight (CW) is assigned for use in the polyrational analysis. Any scale may be used for assigning the criticality weights. The criticality weights represent the criticality of each file characteristic relative to the remaining file characteristics to be included in the polyrational analysis. For example, in a polyrational ransomware analysis, file extension alteration is important therefore the criticality weight assigned for the file extension characteristic is higher than the criticality weight assigned to file size or file character alterations. As illustrated in column C, the criticality weight assigned to the file extension alteration characteristic is 65; as illustrated in column G, the criticality weight assigned to the file size alteration characteristic is 40; and as illustrated in column K, the criticality weight assigned to the file character alteration characteristic is 15. Based upon the assigned criticality weights it is observed that rates relating to file extension alterations are viewed as the most critical and rates relating to file character alterations are viewed as the least critical for this analysis.

As further illustrated in FIG. 3, for each file characteristic and for each time period, a time-of-occurrence weight (ToOW) is provided. These time-of-occurrence weights reflect the importance of the alteration occurring at a specific time relative to the remaining time periods. A higher ToOW will be assigned to those time periods when an alteration in the characteristic would be viewed as abnormal (i.e., unexpected). A lower ToOW will be assigned to those time periods when an alteration in the characteristic would be viewed as normal (i.e., expected). Any scale may be used for the relative time-of-occurrence weights. As illustrated in FIG. 3, column D the ToOWs associated with the file extension characteristic range from 60-100. Those time periods having a ToOw of 100 indicate that alterations occurring to file extensions in that time period are viewed as more abnormal than alterations occurring in a time period having ToOWs of 60. At column H, the ToOWs associated with the file size characteristic are shown to range from 15-100 and at column L, the ToOWs associated with the file character characteristic are shown to range from 10-100.

For each file characteristic, an overall weight is then calculated for each time period by summing the criticality weight and the time-of-occurrence weight, i.e., Overall weight (OW)=critical weight (CW)+time-of-occurrence weight (ToOW)

The overall weights associated with file extension (OW1) are illustrated at column E; the overall weights associated with file size (OW2) are illustrated at column I; and the overall weights associated with file characters (OW3) are illustrated at column M.

Finally, a baseline polyrational threshold (BTH) is calculated for each time period as follows:

$$BTH = \frac{[\text{File } Ext \text{ Change rate} * OW1 + \text{File Size change rate} * OW2 + \text{File Charac change rate} * OW3]}{[OW1 + OW2 + OW3]}$$

As illustrated in FIG. 3, the calculated thresholds for the time periods range from 0 to approximately 35.

When the scanners are operating in monitoring mode, the data needed to calculate the alteration rates for file extensions, file size and file characters is collected and the alteration rates are calculated as described above. Next, using the overall weights (OW1, OW2, OW3) provided in FIG. 3 for the applicable time period (i.e. the time period related to the monitoring activities), a monitoring threshold (MTW) is calculated using the same threshold calculation provided above, i.e.:

$$MTH = \frac{[\text{File } Ext \text{ Change rate} * OW1 + \text{File Size change rate} * OW2 + \text{File Charac change rate} * OW3]}{[OW1 + OW2 + OW3]}$$

For example, data was collected at 10:30 am providing the following monitoring alteration rates:
File Extension Change rate=35;
File Size Change rate=0; and
File Character Change rate=20
The monitoring threshold is calculated as follow:

$$MTH = \frac{[35 * 125 + 0 * 100 + 20 * 75]}{[125 + 100 + 75]} = 19.5833$$

When the MI of 19.583 is compared to the BTH for this same time period, i.e., 21.583, it is noted that the monitoring threshold does not exceed the baseline threshold. Thus, despite the fact that the file extension alteration and the file character alteration rates were higher in the monitoring period than in the baselining period, the file size alteration rate was 0 and therefore the baseline threshold was not exceeded. Because the monitor threshold did not exceed the baseline threshold, no responsive action will be taken by the scanner 242, 252.

The critical weights or time-of-occurrence weights may themselves be additionally adjusted based on the degree of risk associated with the measured data characteristic alterations. The weights in the method described above may be manually determined by the user or may be determined through machine learning algorithms.

With the scanners 242, 252 now configured to perform the scanner operations, the scanners 242, 252 are ready for loading in the hosts 140, 150. As noted above, as a result of the polling performed by the installer 220, the scanner hosts 140, 150 (i.e., the root directories or top-level folders in which scanners will be loaded) have been identified. Each configured scanner 242, 252 is loaded by the installer 220 in an identified scanner host 140, 150. Each configured root scanner 242 is loaded in a root directory 140 (i.e., each root scanner 242 is hosted by a root directory 140) and each configured folder scanner 252 is loaded in a top-level folder 150 (i.e., each folder scanner 252 is hosted by a top-level folder 150). Having gained information concerning the hierarchy of the digital system and having positioned the configured scanners 242, 252 in the various root directories 140 and top-level folders 150 of the digital system 100, the installer 220 then establishes the communication paths between the configured scanners 242, 252. Communication paths provide logical connections between the scanners 242, 252 and are illustrated in FIGS. 2a-2d. The communication paths will be established via manual configuration, automatic configuration based on locations of each scanner 242, 252, or the use of machine learning based on observing the system for a period of time and how the digital system 100 is used.

Figure 2A:
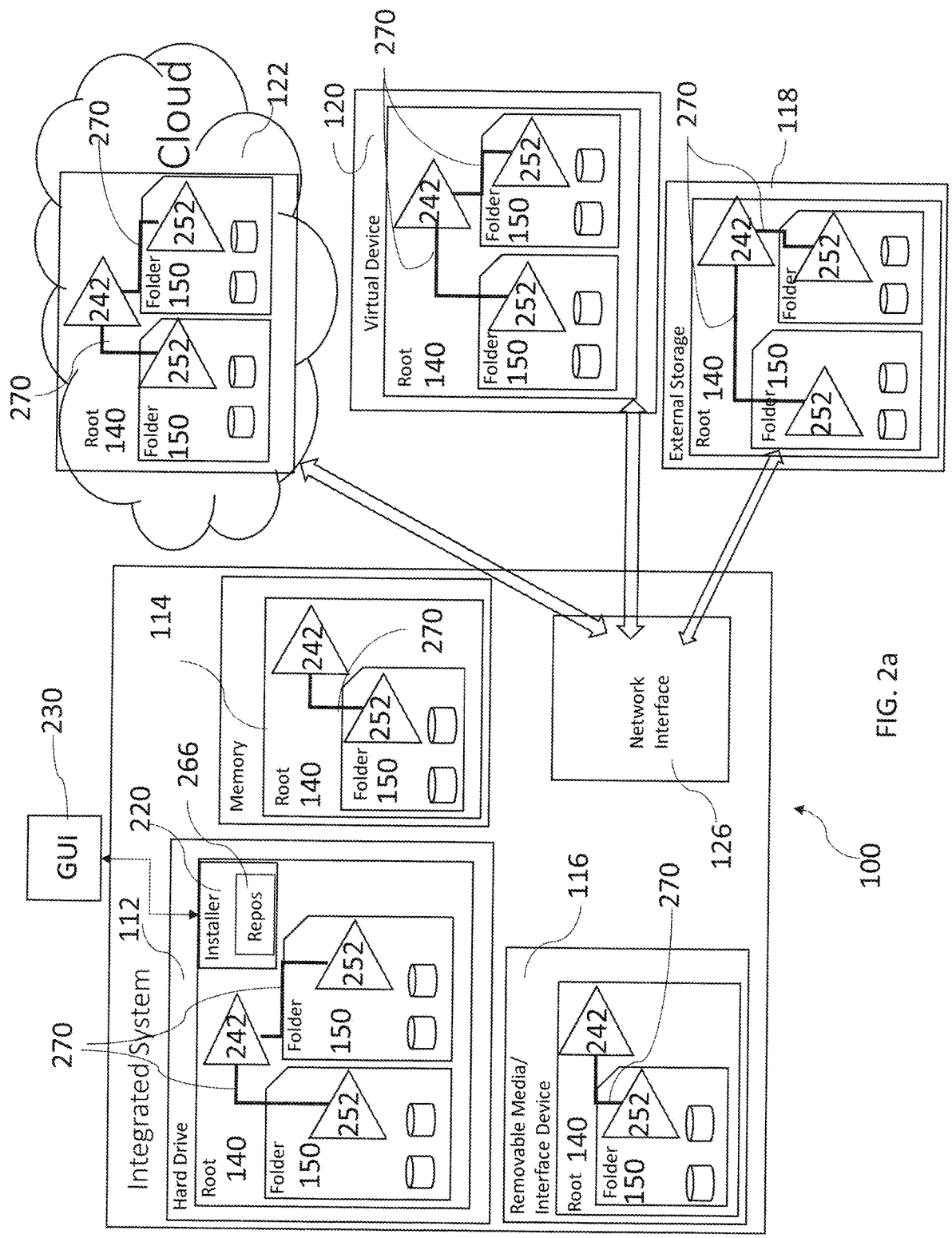
FIG. 2a illustrates the digital system of FIG. 2 and further illustrates intra device root-folder communication paths of the security system.

FIG. 2a illustrates intra device root-folder communication paths 270. Intra device root-folder communication paths 270 allow data to be shared between a root scanner 242 and a folder scanner 252 within the same digital device. The types of data shared by the intra device root-folder communication paths 270 include file parameters, folders parameters, OS configurations, application configurations, OS services, OS policy application permissions, application policies, device interface statuses and health/tamper checks. Although not illustrated, as mentioned above, a device may including multiple root directories 140. In such a case, the invention allows for the loading of a root scanner 252 in each root directory 140 of the device. If necessary of the configured scanner operations these intra-device root-root communication path will be established by the installer 220.

Figure 2B:
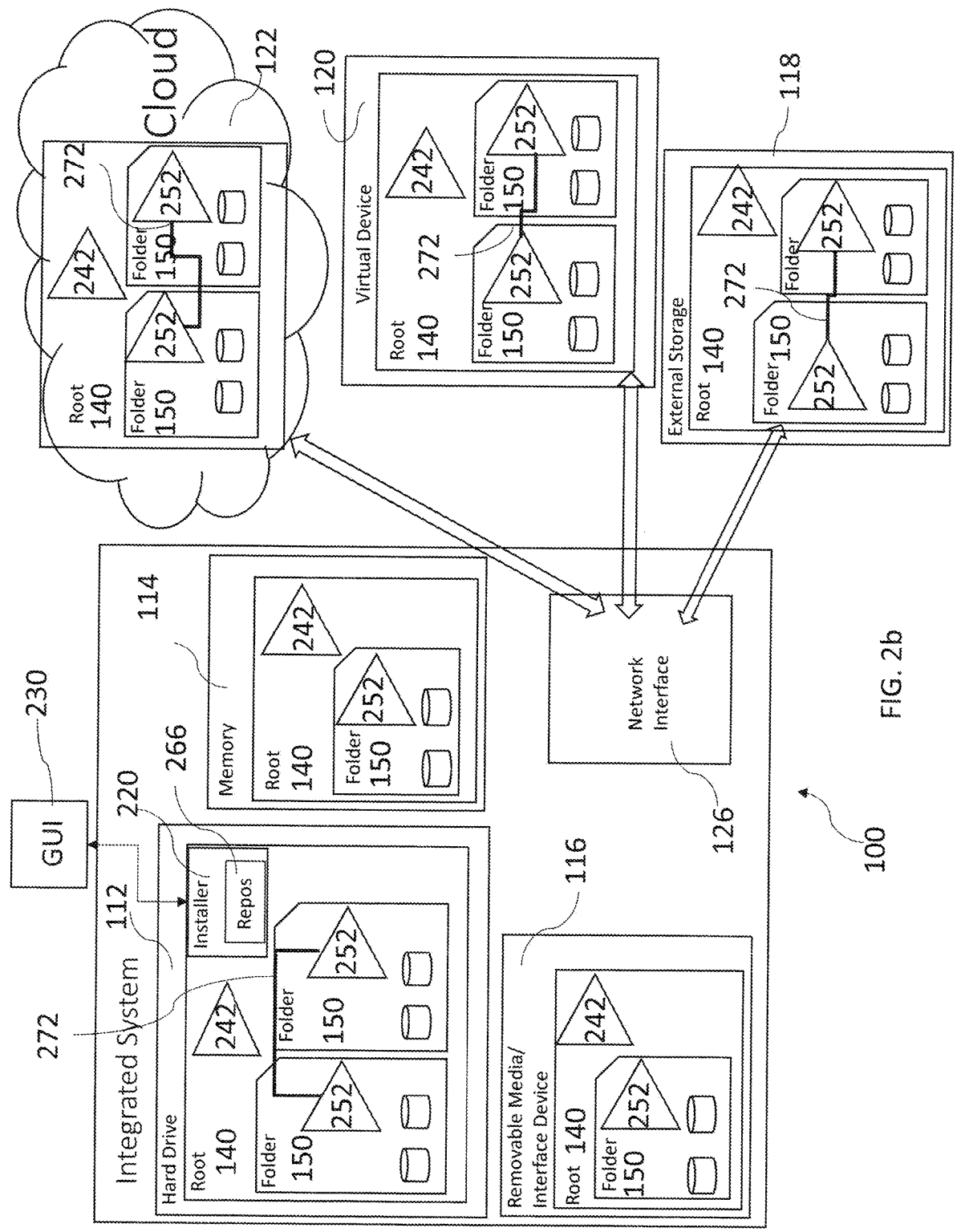
FIG. 2b illustrates the digital system of FIG. 2 and further illustrates intra device folder-folder communication paths of the security system.

FIG. 2b illustrates intra device folder-folder communication paths 272. Intra device folder-folder communication paths 272 allow data to be shared between a folder scanner 252 and another folder scanner 252 within the same digital device. The types of data shared by the intra device folder-folder communication paths 272 include detection alerts, health/tamper checks and backup scans.

Figure 2C:
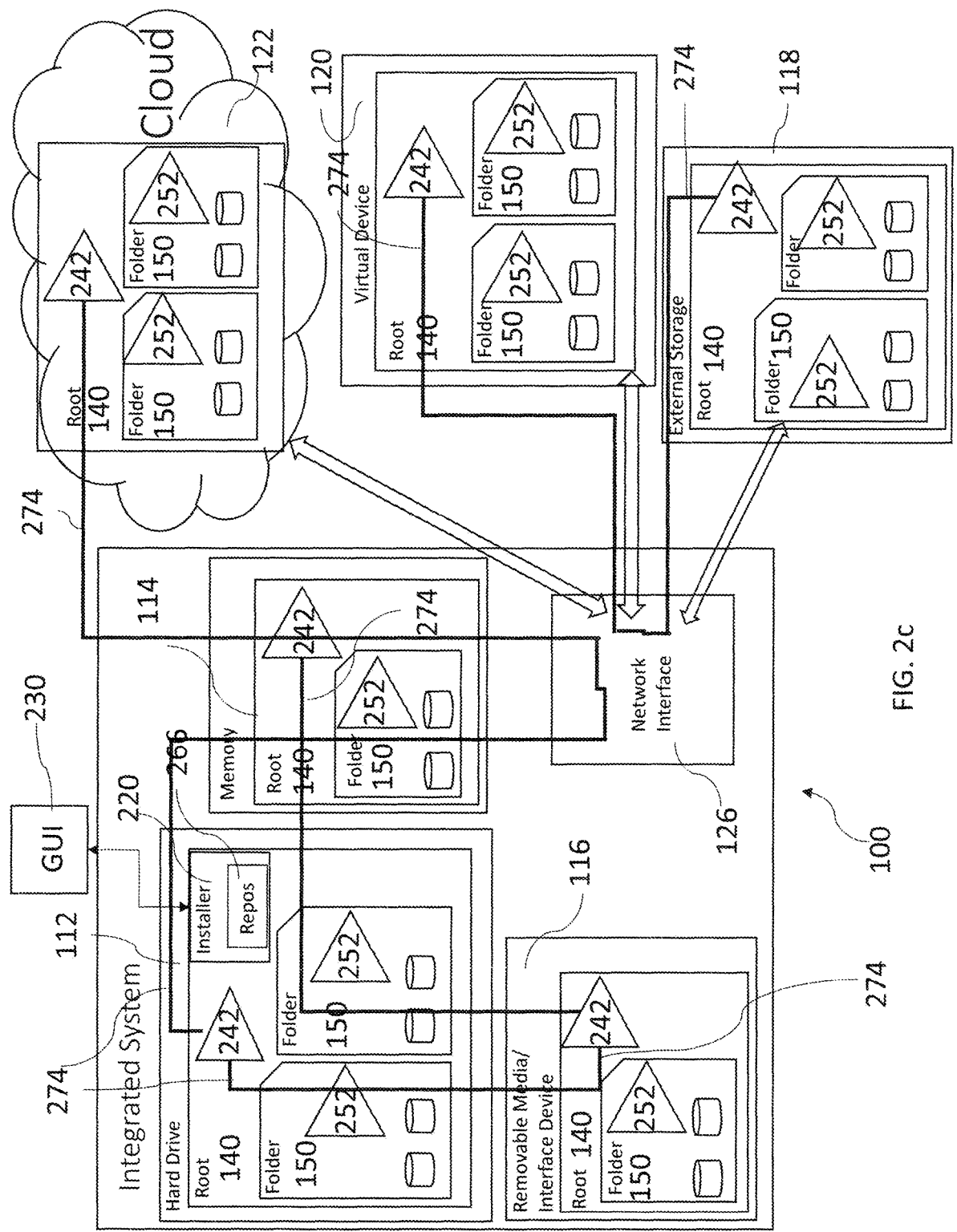
FIG. 2c illustrates the digital system of FIG. 2 and further illustrates inter device root-root communication paths of the security system.

FIG. 2c illustrates a number of inter device root-root communication paths 274. Inter device root-root communication paths 274 allow data to be shared between a root scanner 242 of one digital device with a root scanner 242 of another digital device. Although several inter device root-root communication paths 274 are illustrated in FIG. 2c, to improve legibility of the drawing all possible inter device root-root communication paths 274 are not illustrated. It is noted that some of the inter device root-root communication paths occur via the network interface. The types of data shared by the inter device root-root communication paths 274 includes health/tamper checks and previously analyzed data from scanners within each root 242 Because the external device will provide a different security protocol than the internally connected device, it is noted that data shared via communication paths occurring via the network interface will include security protocol information.

Figure 2D:
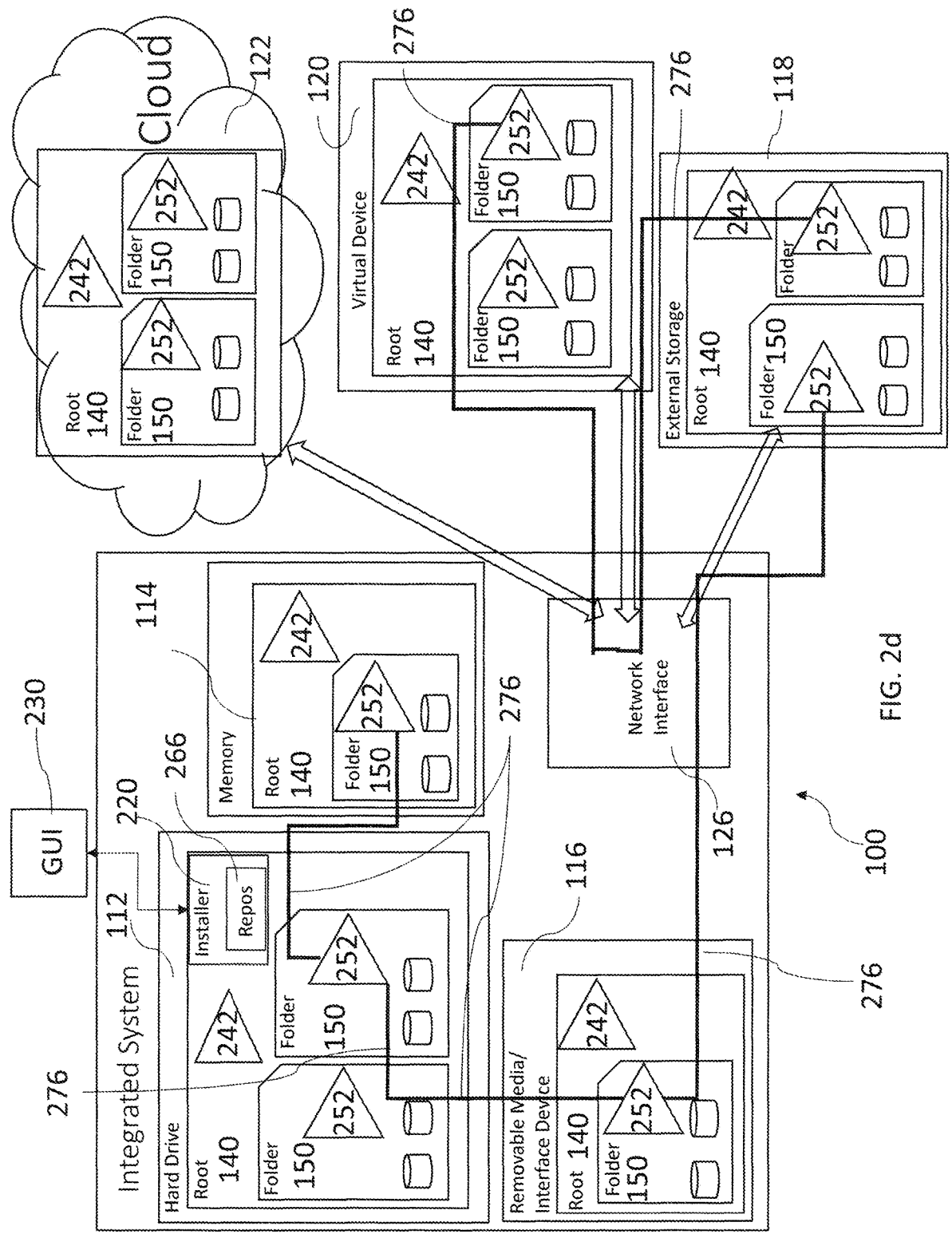
FIG. 2d illustrates the digital system of FIG. 2 and further illustrates inter device folder-folder communication paths of the security system.

Another type of communication path established and illustrated in FIG. 2d is an inter device folder-folder communication path 276. Inter device folder-folder communication paths 276 allow data to be shared between a folder scanner 252 of one digital device with a folder scanner 252 of another digital device. Although several inter device folder-folder communication paths 276 are illustrated in FIG. 2c, to improve legibility of the drawing all possible inter device folder-folder communication paths 276 are not illustrated. It is noted that some of the inter device folder-folder communications paths 276 occur via the network interface. The types of data shared by the inter device folder-folder communication paths 276 include detection alerts, health/tamper checks and backup scans. Although several inter device folder-folder communication paths 276 are illustrated in FIG. 2d, to improve legibility of the drawing all possible inter device folder-folder communication paths 274 are not illustrated. Because the external device will provide a different security protocol than the internally connected device, it is noted that data shared via communication paths occurring via the network interface will include security protocol information.

These communication paths 270, 272, 274, 276 allow for information sharing amongst scanners 242, 252 including those scanners hosted by different digital devices. For example, a folder scanner 252 may be configured to collect data and share the collected data with another folder scanner 252. A scanner 242, 252 may also be configured to analyze collected data and share the analysis of the data collected with other scanners 242, 252. The analysis to be performed by a scanner may be based upon data or analysis received from another scanner. For example, a first scanner may be configured to determine whether a file deletion threshold has been met based upon a rate of file deletion occurring in its host along with the rate of file deletion occurring in another host.

Figure 5:
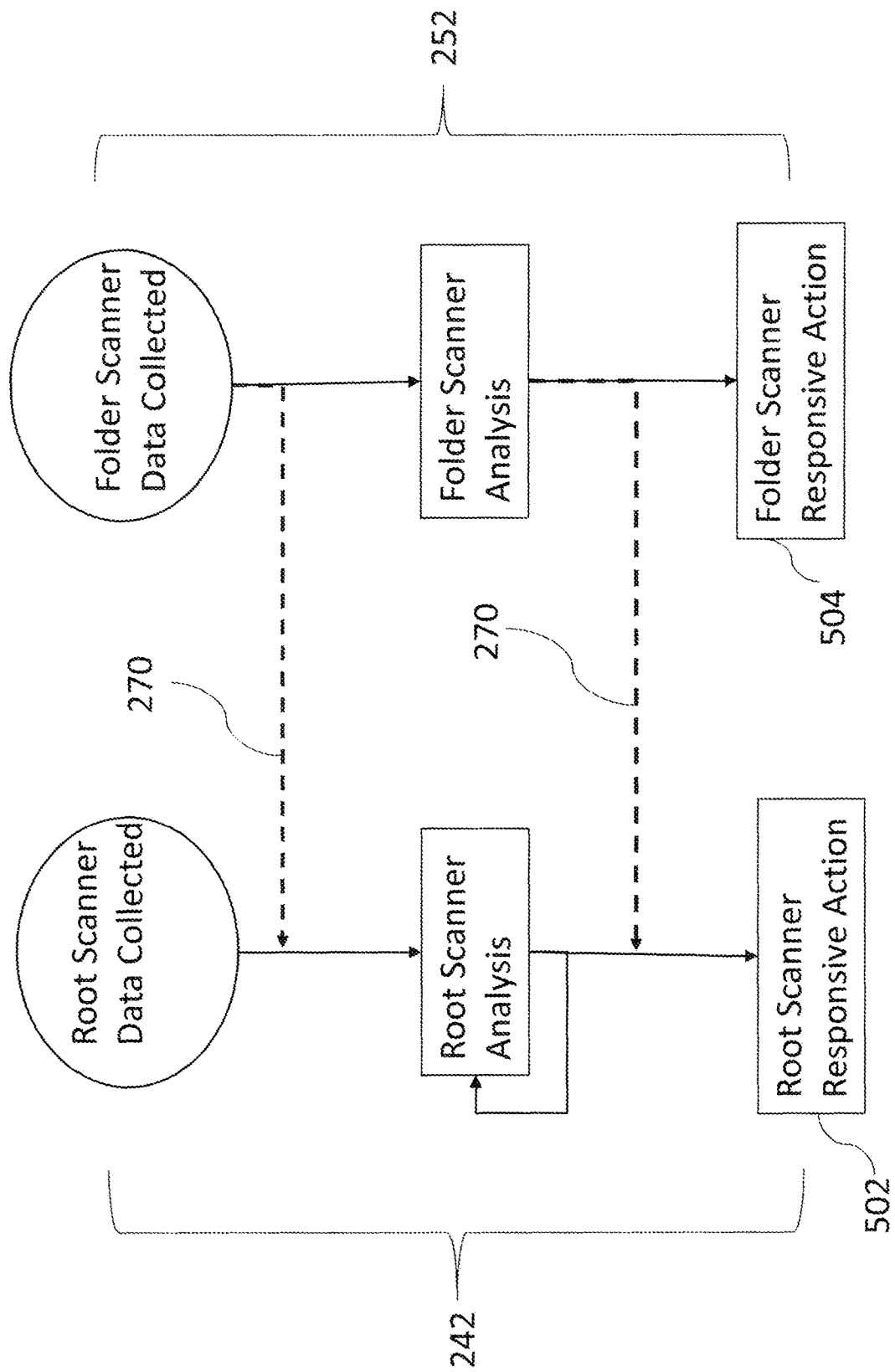
FIG. 5 illustrates functions related to two scanners.

As noted above, a scanner 242, 252 may be configured to take responsive action based upon the data collected by the scanner and/or the analysis performed by the scanner. Information shared amongst the scanners 242, 252 may include these responsive actions. For example, a responsive action of scanner 242, 252 may be sending/sharing data gathered or analysis results to/with other scanners. In another example, based upon the analysis performed by one scanner 242, 252, an instruction may be sent to a receiving scanner directing the receiving scanner to take a particular responsive action. For example, if one scanner is affected by malware, another scanner may be directed to back-up files of the affected scanner. In addition, responsive actions provided by the scanners 242, 252 may be coordinated. A coordinated responsive action may be for example a responsive action which has been influenced by another scanner. FIG. 5 illustrates an example of functions performed by a root scanner 242 resulting a responsive action 502 of the root scanner and functions performed by a folder scanner 242 resulting a responsive action 504. It is noted that the responsive action of the root scanner 252 has been influenced by the functions of the folder scanner 252. More specifically, the folder scanner 252 provides folder scanner data to root scanner 242 via an intra device root-folder communication path 270 and folder scanner analysis to root scanner 242 via an intra device root-folder communication path 270.

The sharing of information using the various communication paths provided by the security system 200 allows each scanner 242, 252 to monitor the entire digital system 100. For example a system-wide view of activities/behaviors occurring on the digital system could include the detection of malicious ports opened on the system in the presence of weak permissions and remote access tools loaded on the system provides a system-wide view of the digital system as vulnerable to remote threats or infiltration. In another example, a system-wide view of the digital system 100 includes unusual port activity along with an increase in application calls to encrypt files, provides a system-wide view that a malicious actor remotely accessed the application via the port to take unauthorized actions.

Figure 4A:
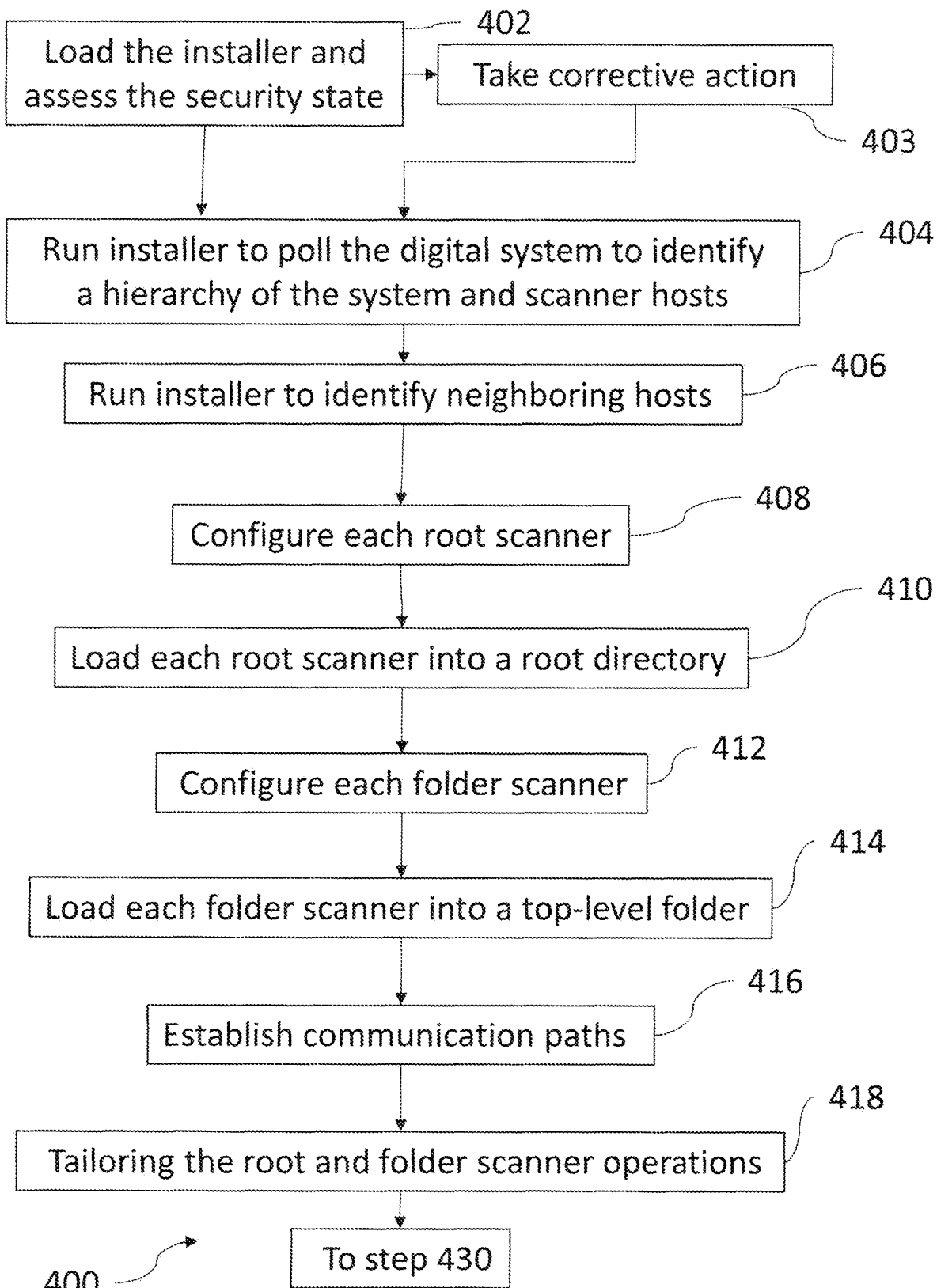
FIGS. 4a and 4b illustrate a method of loading, configuring and operating the security system of the present invention in a digital system
Figure 4B:
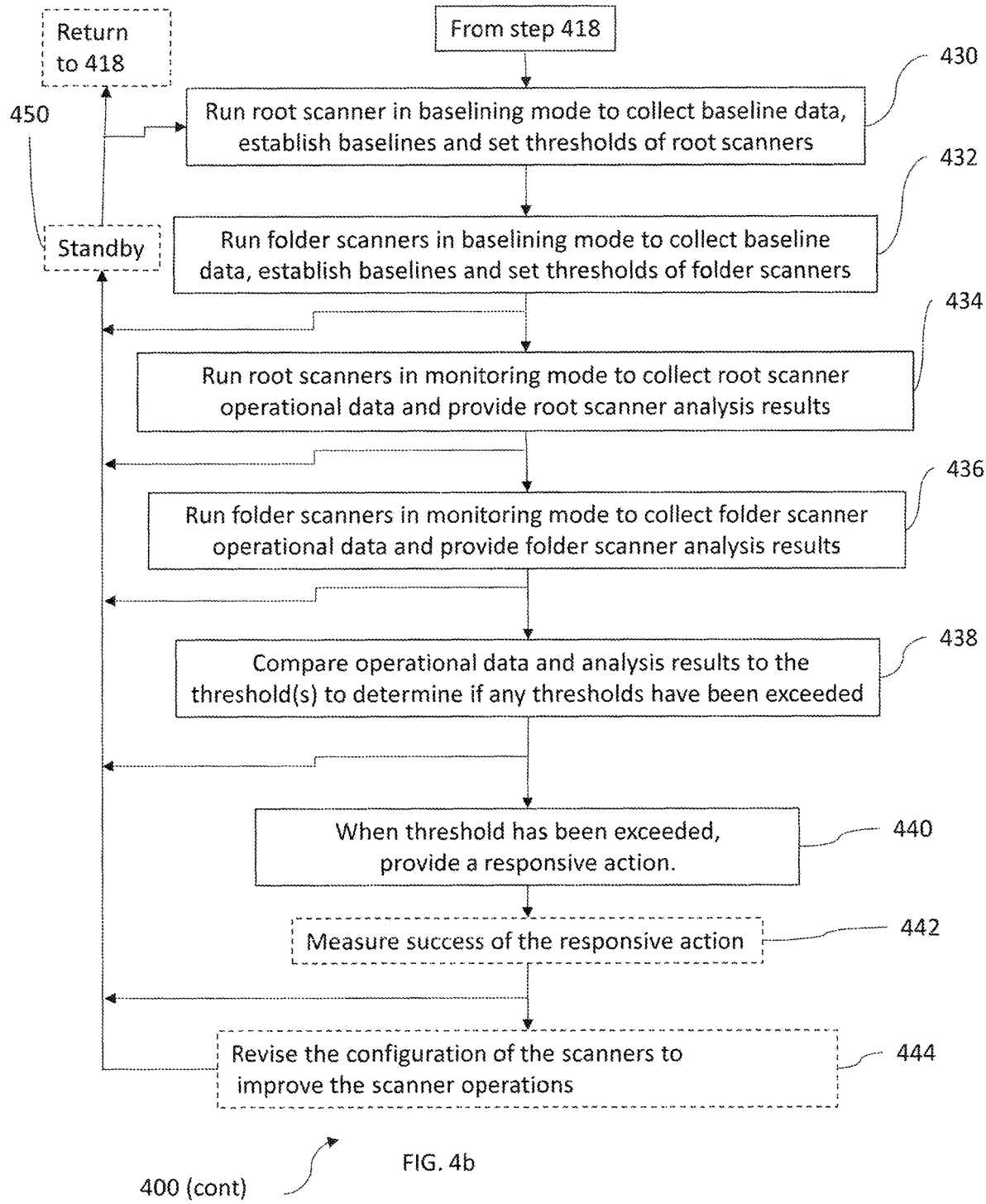

A method 400 of hardening a digital system against malware attacks in accordance with the present invention is illustrated in FIGS. 4a and 4b.

The method begins at step 402 where the installer 220 is loaded on a digital device 112-122 of the digital system 100. The installer 220 is then run to assess the current security state of the digital system 100. For example, the system 100 is assessed to determine whether system characteristics indicate precursors/susceptibility to malware, e.g., vulnerable device settings, absent security, weak permissions on the digital system, ports related to known malicious activity are open, or whether outdated operating systems are present on the digital system 100.

In the event the system characteristics indicate susceptibility to malware, at step 403 corrective actions may be taken to harden the digital system 100. For example, ports related to known malicious activity are closed, weak permissions are strengthened, or outdated operating systems are upgraded.

At step 404, the installer 220 polls the system 100 to identify the hierarchy of the system 100. Upon completion of polling by the installer 220, the following information is known: location of the devices of the system 100; each device type; and the hierarchy of each device including all hosts (i.e., all root directories 140 and top-level folders 150).

Next, at step 406 the installer 220 identifies neighboring hosts. As noted above, a number of characteristics may be used to define hosts as neighboring hosts including, for example, folder attributes/combination of folder attributes, spatial mapping, temporal locality, or folder's user association.

Next, at step 408 the installer 220 configures each root scanner 242. The configuration provided to each root scanner 242 will be selected based upon the type of device 112-122 hosting the root scanner 242 and the operations to be performed by the root scanner. As discussed above, a variety of scanner operations may be performed by each scanner. Configuration of scanner operations defines which files will be scanned by the root scanner 242, how often the scanner 242 will perform each scanner operation, the data to be collected by the scanner 242, thresholds related to the scanner operations, and responsive actions to be performed when the thresholds are exceeded. The root scanner will be configured to collect data, based upon the operations to be performed by the root scanner. Data to be collected by the root scanner encompasses a wide breadth of data types. The particular data to be collected is influenced by the complexity of the device which hosts the scanner and the data of interest to the user. Examples of such data includes: indicators as to what ports are open; whether VPN or peripheral flags are on/off; operating system indicators providing notice as to what applications are stored and/or running; security settings within the application; security settings within the operating system; malware indicators (e.g., malware signature, presence of a particular file name); user history information (e.g., web links visited, email contacts, remote connectivity log); or file and folder parameters (e.g., size, extension type, owner, and read/write/execute permissions). In the scenario in which a root scanner is connected to another scanner via the network interface 126 additional information may need to be collected by the root. The installer 220 may provide for default configuration of each root scanner 242 to define the scanner operations. Alternatively, the installer 220 may provide the user with the ability to select scanner operations to be performed by each root scanner 242.

Next, at step 410 the installer 220 loads each root scanner 242 in a root directory 140.

Next, at step 412 the installer 220 configures the folder scanners 252. The configuration provided to each folder scanner 252 will be selected based upon the type of device 112-122 hosting the folder scanner 252 and the operations to be performed by the folder scanner 252. As discussed above, a variety of scanner operations may be performed by each scanner. Configuration of scanner operations defines which files will be scanned by the folder scanner 252, how often the scanner 252 will perform each scanner operation, the data to be collected by the scanner 252, thresholds related to the scanner operations, and responsive actions to be performed when the thresholds are exceeded. The folder scanner will be configured to collect data, based upon the operations to be performed by the folder scanner. Data to be collected by the folder scanner may include, operating system indicators providing notice as to what applications are stored; security settings within the application; security settings within the operating system; malware indicators (e.g., malware signature, presence of a particular file name); user history information (e.g., web links visited, email contacts, remote connectivity log); or file and folder parameters (e.g., size, extension type, owner, and read/write/execute permissions). The installer 220 may provide for default configuration of each folder scanner 252 to define the scanner operations. Alternatively, the installer 220 may provide the user with the ability to select scanner operations to be performed by each folder scanner 252.

Next, at step 414 the installer 220 loads each folder scanner 252 in a top-level folder 150.

Next, at step 416 the installer establishes the communication paths between the loaded scanners. As described above in connection with FIGS. 2a-2d, the communication paths include intra device root-folder communication paths 270, intra device folder-folder communication paths 272, inter device root-root communication paths 274, and inter device folder-folder communication paths 276. The communication paths 270, 272, 274, 276 are used by the scanners to share data with each other. The establishment of scanner communication paths may be provided by establishing paths between all scanners or by establishing paths between a pre-determined subset of the scanners based upon knowledge of the digital system 100 to which the security system 200 will be installed. In addition, machine learning may be used to observe the system for a period of time to understand how the system is used and then establish communication paths based on that understanding.

At step 418, after loading of the scanners 242, 252 in the hosts (i.e., the root directories and the top-level folders, respectively) the scanner operations to be performed by each scanner 242, 252 may be tailored as desired by the user. The GUI 230 may be utilized to tailor the scanners 242, 252. An example of tailoring of the scanner operations include changing default time intervals to custom time intervals to allow for more or less granularity of thresholds.

As illustrated in FIG. 4b, the process continues at step 430 where the root scanners 242 are run to collect baseline data with the root scanners 242. As noted above, each scanner is configured to collect data associated with the scanner operations and store the data in a repository 266. Data collected by root scanners 242 may include, for example: indicators as to what ports are open; whether VPN or peripheral flags are on/off; operating system indicators providing notice as to what applications are stored and/or running; security settings within the application; security settings within the operating system; malware indicators (e.g., malware signature, presence of a particular file name); user history information (e.g., web links visited, email contacts, remote connectivity log); or file and folder parameters (e.g., size, extension type, owner, and read/write/execute. Collection of the baseline data can occur by leveraging native operations occurring normally within the digital system 100. e.g., native diagnostics, native logging, and native metrics gathering commands. Once the root scanner 242 has collected the baseline data, for each root scanner operation requiring a baseline, the root scanner 242 establishes the baseline and sets a threshold.

Next, at step 432 the folder scanners 252 are run to collect baseline data with the folder scanners 252. As noted above, each scanner 252 is configured to collect data associated with the scanner operations and store the data in a repository 266. The folder scanners 252 use native commands to poll the OS for application/OS users to query, and to gain raw, rudimentary information about the OS and its hosted content (e.g., applications, drivers, policies, interfaces, configurations). Baseline data collected by the folder scanner 252 may include, for example: operating system indicators providing notice as to what applications are stored; security settings within the application; security settings within the operating system; malware indicators (e.g., malware signature, presence of a particular file name); user history information (e.g., web links visited, email contacts, remote connectivity log); or file and folder parameters (e.g., size, extension type, owner, and read/write/execute permissions). Collection of the baseline data can occur by leveraging native operations occurring normally within the digital system 100, e.g., native diagnostics, native logging, and native metrics gathering commands. Once the folder scanner 252 has collected the baseline data, for each folder scanner operation requiring a baseline, the folder scanner 252 establishes the baseline and sets a threshold.

Next, at step 434 the root scanners 242 are run in the monitoring mode to collect operational data with the root scanners 242. The data collected by each root scanner 242 is dependent upon the configuration provided to each root scanner including what scanner operations the root scanner 242 has been configured to perform. Scanner operations may be initiated by a variety of events. For example, scanner operations may be initiated based upon a scheduled time, the occurrence of an event within the digital system 100, or in response to an instruction from another scanner. Native operations occurring normally within the digital system 100 (e.g., native diagnostics, native logging, and native metrics gathering commands, built-in-tools, configuration controls), may be leveraged to collect the data. Operational data collected by each root scanner 242 is the same type of data collected during the baselining mode of that scanner 242. In addition to collecting the operational data, any file analysis or system analysis operations to be performed in accordance with the scanner operations are completed by the root scanner 242 to provide root scanner analysis results.

At step 436 the folder scanners 252 are run in the monitoring mode to collect operational data with the folder scanners 252. The data collected by each folder scanner 252 is dependent upon the configuration provided to each folder scanner including what scanner operations the folder scanner 252 has been configured to perform. Scanner operations may be initiated by a variety of events. For example, scanner operations may be initiated based upon a scheduled time, the occurrence of an event within the digital system 100, or in response to an instruction from another scanner. Native operations occurring normally within the digital system (e.g., native diagnostics, native logging, and native metrics gathering commands, built-in-tools, configuration controls), may be leveraged to collect the operational data. Operational data collected by each folder scanner 252 is the same type of data collected during the baselining mode of that scanner 252. In addition to collecting the operational data, any file analysis or system analysis operations to be performed in accordance with the scanner operations are completed by the folder scanner 252 to provide folder scanner analysis results.

Next, at step 438, the operational data collected and analysis results provided at steps 434 and 436 are compared with the thresholds set at steps 430 and 432 to determine whether any thresholds have been exceeded.

Next, at step 440, when a threshold has been exceeded, a responsive action is provided. The types of responsive actions which may be taken vary widely. A responsive action may simply be notifying the user of the activity which exceeded the threshold or sending a message to another scanner. Responsive actions also include, for example purging memory, removing malicious content, reconfiguring security settings, disablement/termination of access, enablement of firewall, transfer/relocation of backup files or content, lockdown points of entry into the system, terminating processes, or other overt actions. Responsive actions may also include calculating of risk level based upon the data collected and communicating the risk to the user to allow the user to assess what additional action if any should be taken.

At step 442, optionally the success of the responsive action is evaluated and an after action report is generated. At this step, the system may document actions that have been taken e.g., how many ports were closed, how many outdated policies were updated, how many weak permission were strengthened, how many unauthorized remote connections were removed, etc. In addition, the presence of malicious content or conditions enabling malicious activity which remains on the digital system are documented. This step may include generating a list of best practices that should be implemented in order to further harden the digital system 100.

At step 444 the configuration of the scanners may be revised based on the measure of success provided at step 442 in order to improve future performance of the scanners 242, 252 thereby further hardening the digital system 100.

As illustrated in FIG. 4b, a standby mode 450 is provided for placing the scanners of the security system 200 in a standby mode. At any time during system operations, a user may place a scanner or a group of scanners into a standby mode. An access code is required to gain access the standby mode 450. In the standby mode 450, activities taking place on the digital system 100 do not effect scanner operations or the data collected by the scanners 242, 252. The standby mode 450 is designed to allow authorized actions related to the digital system 100 to occur without collecting data or initiating responses to the authorized actions taken. For example, if an authorized user wants to encrypt or delete a large number of files from the digital system 100 without affecting the data collected by scanners 242, 252 and without triggering the configured responsive actions, the scanner(s) may be temporarily placed in the standby mode and the files may be encrypted/deleted without triggering the responsive action which would normally occur based on the scanner configurations. In another example, the scanners may be placed in standby mode 450 while scanner operations are re-configured. Upon completion of the authorized actions, standby mode 450 may be exited and the scanners may return to their normal operations. Before returning to the scanners to the monitoring mode of steps 434,436, the scanners may return to the baselining mode of steps 430, 432 to re-establish baselines and thresholds.

Although steps 430-436 are described as sequential, it is to be understood that these steps may occur in any order or may occur simultaneously.

In a test of the security system 200, an installer was loaded in a root directory of a device and scanners were loaded in each root directory and each top-level folder of each device in the digital system. With the security system operating in a monitoring mode, the system detected the presence of three well-known ransomware attacks (WannaCry, Jigsaw and Thanos) within 1-4 seconds of activation of the attack. For example, the presence of the WannaCry malware was detected by a scanner, running in the monitoring mode, as a result of the malware's attempt to access a known malicious website. Furthermore, once the malware began encryption of files, the scanners, while running in monitoring mode, detected the encryption, and provided the responsive actions of stopping any further execution of the malware and quarantining the malware within 25 milliseconds.

By providing multiple scanners positioned in a plurality of hosts in the digital system, the security system 200 provides multiple locations at which scanning operations may be initiated allowing multiple scan operations to occurring simultaneously thereby providing the advantage that a scan of the system may be completed more quickly with the security system 200 than with prior art systems which rely on sequential, consecutive scanning initiated at a central location of the digital system. As a result, scanner operations performed by the security system 200 are able to outpace malware operations minimizing the effect of these operations on the digital system. It is noted that the preferred embodiment of the invention provides for placement of scanners in each root directory and each top-level folder. Although it is feasible to place additional scanners in lower-level folders to further increase the speed of the scanning operations, the placement of scanners in the root directors and top-level folders achieves the desired goal of increasing the speed of the scanning operations without over complicating the process of loading and running the scanners. Furthermore, it has been found that most malware attacks are directed at root directories and top-level folders, therefore limiting the placement of scanners to these higher levels of the hierarchy does not diminish the effectiveness of the security system 200. It is further noted, that in the event it is desired to scan specific lower level folders more frequently, scanners may be placed in these specific lower level folders.

As noted above, a prior art centralized scanner is typically placed in a top-level folder. In contrast, the security system 200 utilizes scanners placed in root directories as well as top-level folders. Placement of a scanner in a root directory (e.g., kernel) provides the advantage that the scanner will have greater visibility/access to activity occurring in the application layer (i.e., a top level folder). One of the advantages provided by the higher visibility is that the scanner can observe ransomware attacks occurring in memory which are often overlooked by centralized scanners operating in the application layer.

By providing multiple scanners positioned in a plurality of hosts in the digital system 100, the security system 200 is more resilient, i.e., the security system 200 is less prone to attack. If one scanner 242, 252 is disabled, the remaining scanners 242, 252 may continue their scanning operations and if configured to do so, upon receipt of data indicating that a scanner has been disabled, the remaining scanners 242, 252 may be able to perform the scanning operations of the disabled scanner.

The security system 200 uses multiple scanners in communication with each other to provide a collection of information providing a system-wide view of the digital system 100 which allows for the detection of malware attacks which would go unnoticed using a centralized scanner. Malware attackers desire to remain unnoticed in the digital system for as long as possible. To do so the attacker may attempt to ensure that any changes to the digital device are subtle in order to avoid detection. By providing multiple scanners, subtle variations (e.g., a small number of file encryptions) detected by one scanner can be shared with other scanners over the scanner communication paths. When this collective information is analyzed by the scanners, the depth of an attack which may be overlooked with a traditional centralized scanner is more readily apparent.

Scanner operations can be configured to perform polyrational time-based analyses utilizing coordinate time period specific baseline data collected by various scanners to establish a coordinated threshold for comparison with coordinated time period specific operational data. In this manner, data related to events occurring at a specific time period but captured by various scanners may be used to determine whether the coordinated threshold has been exceeded. The coordinated data allows for a time-based system-wide view of the digital system.

In addition to detecting malware operations, the security system 200 also provides the user with the ability to assess the security of the digital system. This assessment quickly and proactively observes malware precursors (e.g., vulnerable device settings, absent security, weak permissions) and active presence of device software changes (e.g., file size increase, file type different, file encryption present, new software present, software missing) to characterize the observation and counter the threat (e.g., terminate process associated with observed activities, restore security, re-enact configuration settings, restore removed software).

Another advantage provided by the security system 200 is the ability to independently configure each scanner 142, 152. This allows the user to refine and narrow the scanning to better adapt to the user's prioritized objectives. For example, if the user's objective is related to privacy, then the user could target the scanner's operation to protect folders containing private information.

While embodiments of the present invention are shown and described, it is envisioned that those skilled in the art may devise various modifications of the present invention without departing from the spirit and scope of the appended claims.

The invention claimed is:

1. A method of securing a digital system including a plurality of digital devices, the method comprising:
polling the plurality of digital devices associated with the digital system to obtain digital system information, wherein the digital system information includes a device hierarchy for each of the plurality of digital devices;
identifying first and second host locations on one or more host digital devices among the plurality of digital devices based on the device hierarchies for the plurality of digital devices, wherein the first and second scanner host locations correspond to one of a root directory or a top-level folder on the one or more host digital devices;
configuring a first scanner to perform a first set of one or more scanner operations and a second scanner to perform a second set of one or more scanner operations;
loading the first scanner into the first host location and the second scanner into the second host location;
establishing a communication path between the first and second scanners to share scanner information between the first and second scanners;
after performing the first set of one or more scanner operations with the first scanner and the second set of one or more scanner operations with the second scanner, obtaining the scanner information that corresponds to results of the first and second sets of scanner operations; and
taking responsive actions based upon the results of the first and second sets of scanner operations.

2. The method of claim 1, wherein the established communication path includes an intra device root directory to top-level folder communication path.

3. The method of claim 1, wherein the established communication path includes an intra device top-level folder to top-level folder communication path.

4. The method of claim 1, wherein the first and second host locations are associated with different host digital devices among the one or more host digital devices.

5. The method of claim 4, wherein the one or more host digital devices associated with the first and second host locations are connected via a network interface.

6. The method of claim 1, wherein the established communication path includes an inter device root directory to root directory communication path.

7. The method of claim 1, wherein the established communication path includes an inter device top-level folder to top-level folder communication path.

8. The method of claim 1, wherein the first and second sets of one or more scanner operations includes different scanner operations.

9. The method of claim 1, wherein the first and second sets of one or more scanner operations includes at least one of an encryption analysis, file deletion analysis, landmine file analysis, time-based polyrational file analysis, content scanning, data collection, process shut-down analysis, system vulnerability analysis, and scanner functionality analysis.

10. The method of claim 1, further comprising the steps of:
running the first and second scanners in a baseline mode to establish a baseline and a threshold calculated based on the baseline;
running the first and second scanners in a monitoring mode; and
determining when the threshold has been exceeded and taking a responsive action when the threshold has been exceeded.

11. The method of claim 1, further including the step of placing the first and second scanners in a stand-by mode and re-configuring the first and second scanners.

12. The method of claim 1, wherein the step of polling the plurality of digital devices associated with the digital system is provided by an installer.

13. The method of claim 1, wherein the plurality of digital devices corresponds to volatile memory or non-volatile memory storage devices.

14. The method of claim 1, wherein the digital system information further includes device type information for each of the plurality of digital devices in the digital system, wherein the first scanner is configured to perform the first set of one or more operations based on first device type information associated with a first host device among the one or more host digital devices associated with the first host location, and wherein the second scanner is configured to perform the second set of one or more operations based on second device type information associated with a second host device among the one or more host digital devices associated with the first host location.

15. The method of claim 1, wherein the digital system information further includes security state information for each of the plurality of digital devices, wherein the first scanner is configured to perform the first set of one or more operations based on first security state information associated with a first host device among the one or more host digital devices associated with the first host location, and wherein the second scanner is configured to perform the second set of one or more operations based on second security state information associated with a second host device among the one or more host digital devices associated with the first host location.

16. A security system for use in connection with a digital system comprising:
   one or more processors;
   a local bus;
   a network interface;
   non-transitory memory; and
   one or more programs stored in the non-transitory memory, which, when executed by the one or more processors, cause the security system to:
      poll, via at least one of the local bus and the network interface, a plurality of digital devices associated with the digital system to obtain digital system information, wherein the digital system information includes a device hierarchy for each of the plurality of digital devices;
      identify first and second host locations on one or more host digital devices among the plurality of digital devices based on the device hierarchies for the plurality of digital devices, wherein the first and second scanner host locations correspond to one of a root directory or a top-level folder on the one or more host digital devices
      configure a first scanner to perform a first set of one or more scanner operations and a second scanner to perform a second set of one or more scanner operations;
      load the first scanner into the first host location and the second scanner into the second host location; and
      establish a communication path between the first and second scanners.

17. The security system of claim 16, wherein the established communication path is an inter device root directory to root directory communication path.

18. The security system of claim 16, wherein the established communication path is an inter device top-level folder to top-level folder communication path.

19. The security system of claim 16, wherein the established communication path is an intra device root directory to top-level folder communication path.

20. The security system of claim 16, wherein the established communication path is an intra device top-level folder to top-level folder communication path.

21. The security system of claim 16, further including an installer, wherein the installer is configured to poll the plurality of digital devices associated with the digital system.

22. The security system of claim 16, further including an installer, wherein the installer is configured to establish the communication path.

23. The security system of claim 16, wherein the plurality of digital devices corresponds to volatile memory or non-volatile memory storage devices.

24. The security system of claim 16, wherein the first and second host locations are associated with different host digital devices among the one or more host digital devices.

25. The security system of claim 16, wherein the first and second sets of one or more scanner operations includes different scanner operations.

26. The security system of claim 16, wherein the digital system information further includes device type information for each of the plurality of digital devices in the digital system, wherein the first scanner is configured to perform the first set of one or more operations based on first device type information associated with a first host device among the one or more host digital devices associated with the first host location, and wherein the second scanner is configured to perform the second set of one or more operations based on second device type information associated with a second host device among the one or more host digital devices associated with the first host location.

27. The security system of claim 16, wherein the digital system information further includes security state information for each of the plurality of digital devices, wherein the first scanner is configured to perform the first set of one or more operations based on first security state information associated with a first host device among the one or more host digital devices associated with the first host location, and wherein the second scanner is configured to perform the second set of one or more operations based on second security state information associated with a second host device among the one or more host digital devices associated with the first host location.

28. A method of securing a digital system including a plurality of digital devices, the method comprising:
   polling the plurality of digital devices associated with the digital system to obtain digital system information, wherein the digital system information includes device type information for each of the plurality of digital devices in the digital system;
   identifying a first host location associated with a first host digital device and a second host location associated with a second host digital device among the plurality of digital devices;
   configuring a first scanner to perform a first set of one or more scanner operations based on first device type information associated with the first host digital device and a second scanner to perform a second set of one or more scanner operations based on second device type information associated with the second host digital device;
   loading the first scanner into the first host location and the second scanner into the second host location;
   establishing a communication path between the first and second scanners to share scanner information between the first and second scanners;

after performing the first set of one or more scanner operations with the first scanner and the second set of one or more scanner operations with the second scanner, obtaining the scanner information that corresponds to results of the first and second sets of scanner operations; and taking responsive actions based upon the results of the first and second sets of scanner operations.

\* \* \* \* \*